United States Patent
van Boxtel

(10) Patent No.: US 11,577,588 B2
(45) Date of Patent: Feb. 14, 2023

(54) OPEN ROOF CONSTRUCTION FOR A VEHICLE

(71) Applicant: Inalfa Roof Systems Group B.V., Oostrum (NL)

(72) Inventor: Eduardus Christianus Henricus van Boxtel, Zeeland (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 17/109,867

(22) Filed: Dec. 2, 2020

(65) Prior Publication Data
US 2021/0162844 A1    Jun. 3, 2021

(30) Foreign Application Priority Data

Dec. 3, 2019 (EP) .................................... 19213320

(51) Int. Cl.
*B60J 7/043* (2006.01)
*B60J 10/82* (2016.01)
(Continued)

(52) U.S. Cl.
CPC ............ *B60J 7/0435* (2013.01); *B60J 10/82* (2016.02); *B60J 10/84* (2016.02); *E05D 15/00* (2013.01);
(Continued)

(58) Field of Classification Search
CPC .. B60J 7/0435; E05D 15/00; E05Y 2201/626; E05Y 2201/684; E05Y 2900/542
(Continued)

(56) References Cited

U.S. PATENT DOCUMENTS 3,970,343 A * 7/1976 Horn .................... B60J 7/053
                                                                   296/222
4,650,243 A    3/1987 Hanley et al.
(Continued)

FOREIGN PATENT DOCUMENTS

DE    3802380 A1    8/1988
DE    9302762 U1    4/1993
(Continued)

OTHER PUBLICATIONS

European Search Report for European Patent Application No. 119213320.5, dated Jun. 8, 2020.

*Primary Examiner* — Dennis H Pedder
*Assistant Examiner* — Joyce Eileen Hill
(74) *Attorney, Agent, or Firm* — Steven M. Koehler; Westman, Champlin & Koehler, P.A.

(57) ABSTRACT

An open roof construction for a vehicle having a roof opening in a roof part, comprising a panel, and a first device for moving the rear side of the panel towards a raised position relative to the closed position and above an adjoining roof part. The control slide and the lifting member are guided by a guide rail having grooves and extending in longitudinal direction alongside the opening and below the adjoining roof part. A support lever cooperates with the control slide and supports the panel in positions in which it is above the adjoining roof part. The support lever is guided in the guide rail and is adapted to also pass through the passage opening. The support lever takes over support of the panel from an intermediate guide connection of the lifting lever and the intermediate guide connection is then disengaged from the guide curve in the control slide.

14 Claims, 3 Drawing Sheets

(51) Int. Cl.
*B60J 10/84* (2016.01)
*E05D 15/00* (2006.01)

(52) U.S. Cl.
CPC ... *E05Y 2201/626* (2013.01); *E05Y 2201/684* (2013.01); *E05Y 2900/542* (2013.01)

(58) Field of Classification Search
USPC ............ 296/216.02, 216.03, 216.04, 216.05, 296/216.08, 222, 223
See application file for complete search history.

(56) References Cited

U.S. PATENT DOCUMENTS

| | | |
|---|---|---|
| 4,679,846 A | 7/1987 | Lux et al. |
| 4,699,421 A | 10/1987 | Schaetzler et al. |
| 4,741,573 A | 5/1988 | Yokota |
| 4,923,246 A | 5/1990 | Takahashi et al. |
| 4,978,165 A | 12/1990 | Schreiter et al. |
| 4,995,665 A | 2/1991 | Ichinose et al. |
| 5,026,113 A | 6/1991 | DiCarlo et al. |
| 5,447,355 A | 9/1995 | Kelm |
| 5,464,267 A | 12/1995 | Racine et al. |
| 5,707,102 A | 1/1998 | Takahashi et al. |
| 6,416,122 B1 | 7/2002 | Schwarz et al. |
| 6,652,022 B2 | 12/2003 | Pfalzgraf et al. |
| 6,805,402 B2 | 10/2004 | Pfalzgraf et al. |
| 7,178,862 B2 | 2/2007 | Dechel |
| 7,828,376 B2 | 12/2010 | Nellen |
| 2002/0070586 A1* | 6/2002 | Kohout ............... B60J 10/90 296/216.09 |
| 2002/0113467 A1 | 8/2002 | Manic |
| 2002/0145310 A1 | 10/2002 | Schatzler et al. |
| 2002/0163227 A1 | 11/2002 | Pfalzgraf et al. |
| 2005/0231007 A1 | 10/2005 | Oechel |
| 2009/0179462 A1 | 7/2009 | Nellen |
| 2012/0169091 A1* | 7/2012 | Renaudin ............... B60J 7/0435 296/216.03 |
| 2019/0126733 A1* | 5/2019 | Beelen ..................... B60J 7/043 |
| 2019/0176603 A1* | 6/2019 | van De Westerlo ..... B60J 10/82 |

FOREIGN PATENT DOCUMENTS

| | | |
|---|---|---|
| DE | 19713347 C1 | 5/1999 |
| DE | 10348545 A1 | 5/2005 |
| DE | 102004018461 A1 | 11/2005 |
| DE | 102004042450 A1 | 3/2006 |
| DE | 102005007031 A1 | 8/2006 |
| DE | 102005059285 A1 | 6/2007 |
| EP | 0381066 A2 | 8/1990 |
| EP | 1223065 A1 | 7/2002 |
| EP | 2078630 A1 | 7/2009 |
| EP | 2008100338.6 | 7/2009 |
| EP | 2078630 B1 | 3/2011 |
| FR | 2726512 A1 | 5/1996 |
| KR | 920008091 B1 | 9/1992 |
| KR | 20090077698 A | 7/2009 |
| KR | 101607085 B1 | 3/2016 |
| NL | 1014023 C2 | 7/2001 |
| WO | 2006086955 A1 | 8/2006 |
| WO | 2007079747 A1 | 7/2007 |

* cited by examiner

OPEN ROOF CONSTRUCTION FOR A VEHICLE

BACKGROUND

The discussion below is merely provided for general background information and is not intended to be used as an aid in determining the scope of the claimed subject matter.

The invention relates to an open roof construction for a vehicle having a roof opening defined in a roof part of the vehicle, comprising at least a panel which is movable between a closed position in which it closes the roof opening and an open position in which it opens the roof opening and is positioned at least partially above an adjoining roof part, a first device for moving the rear side of the panel towards a raised position relative to the closed position and above the adjoining roof part, and a second device for moving and/or supporting the front side of the panel, wherein the first device includes a lifting member slidably cooperating with a control slide for moving the panel at least to a venting position in which the rear end of the panel is raised, the control slide and the lifting member being guided by a guide rail having at least a guide groove and extending in longitudinal direction of the vehicle alongside the roof opening and below the adjoining roof part, one or more seals closing off a passage opening alongside the adjoining roof part above the guide rail and allowing passage of the lifting member in positions of the panel above the adjoining roof part.

A different type of open roof construction includes a first or rear device comprising a knee lever consisting of a lifting lever and a support lever connected to the upper end thereof. The lifting lever is pivotally and slidably connected to the panel and the control slide is connected to the front pivot of the lifting lever. The vertical movement of the lifting lever is caused by a guide curve in the lifting lever sliding along a control pin on a support slide carrying the support lever.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In an open roof construction, a support lever is included and cooperates with the control slide and supports the panel at least in positions in which the panel is above the adjoining roof part, the support lever being guided in the guide groove of the guide rail and is adapted to also pass through the passage opening.

By having an additional support lever guided in the same guide rail, it is possible to move them both to a position behind the roof opening as they can both be made to pass the seal in the adjoining roof part to extend from the guide rail below the roof part to the panel above the roof part. Due to the rear position of the lifting member, the panel will be supported in a stable manner in all its positions, not only in positions in which the support lever supports the panel.

The simplest embodiment is obtained if the lifting member and the support lever are aligned in longitudinal direction and are preferably positioned such that they do not overlap in any position.

Due to the alignment of the lifting member and support lever, no separate measure is necessary to enable both to pass the seal in the adjoining roof part. This is further enabled by a lack of overlap so that they can take any position despite their alignment in longitudinal direction.

In another embodiment, the lifting member and the support lever do overlap only in parts which, in the positions of the panel above the adjoining roof part, are fully below or above the one or more seals of the passage opening.

In this embodiment, the lifting member and the support lever may be aligned in longitudinal direction at the height of the seal in the adjoining roof part and may be relatively offset above and below the seal. At least a portion of one of the lifting member or support lever may be laterally offset to allow an overlap in one or more positions.

The support lever may be pivotally fixed to the panel directly, which allows complete alignment of both the lifting member and the support lever.

Alternatively, the support lever may be pivotally fixed to the lifting member, although a hybrid solution is also conceivable in which the lifting member and the support lever are connected to the panel at the same position, so that the support lever is connected both to the lifting member and directly to the panel.

The support lever may be connected to the lifting member at a position in a central section between ends of the lifting member, and always remains below the seals of the passage opening.

In this manner, the lifting member will support the panel in all its positions, although the lifting member will be supported by the support lever in upward positions of the panel.

Alternatively, the support lever may be connected to the lifting member at a position in an end section thereof beyond the position where the lifting member is connected to the panel.

This allows the most rearward arrangement of the support lever, while still connecting through the lifting member.

In a preferred embodiment, the support lever takes over the lifting function of the lifting member during a movement of the panel from its closed position upwardly.

In a convenient embodiment thereof, the lifting member is a lifting lever cooperating with the control slide through at least one and preferably two pin-curve connections, one acting as a lower pivot, the other being inactive when the support lever takes over the lifting function of the lifting lever.

The lifting lever and the support lever preferably extend from the panel in forward direction when the panel is in the closed position.

This leads to the most compact arrangement of the lifting and support levers.

The support lever may have a lower pivot pin, which is slidable with respect to the control slide when the lifting member is active, and which is locked with respect to the control slide when the support lever takes over the lifting function of the lifting member.

In this manner, the control slide may slide with respect to both the lifting member and the support lever.

A simple lock of the support lever with respect to the control slide may for example be obtained if the support lever comprises a locking member near the lower pivot pin, the locking member being moved into its locking position with respect to the control slide when the support lever is rotated to its most upward position in which its supports the panel.

No additional parts are then required to effect the locking action.

According to an alternative solution there is provided a support lever also cooperating with the control slide and supporting the panel at least in positions in which the panel is above the adjoining roof part, the support lever taking over support of the panel from the intermediate guide connection of the lifting lever at least in positions of the panel above the adjoining roof part, in which the intermediate guide connection is disengaged from the guide curve in the control slide. As a result, the support lever is able to lift the rear side of the panel to a higher level without requiring a greater height of the control slide to guide the intermediate guide connection to a higher level, thereby obtaining a greater lifting height without a larger Z-package (or because of which the same lifting height can be obtained with a smaller Z-package).

BRIEF DESCRIPTION OF THE DRAWINGS

Further details and advantages of the invention will become more clear from the following description of an embodiment of the invention with reference to the drawings.

DETAILED DESCRIPTION OF THE ILLUSTRATIVE EMBODIMENTS

Figure 1:
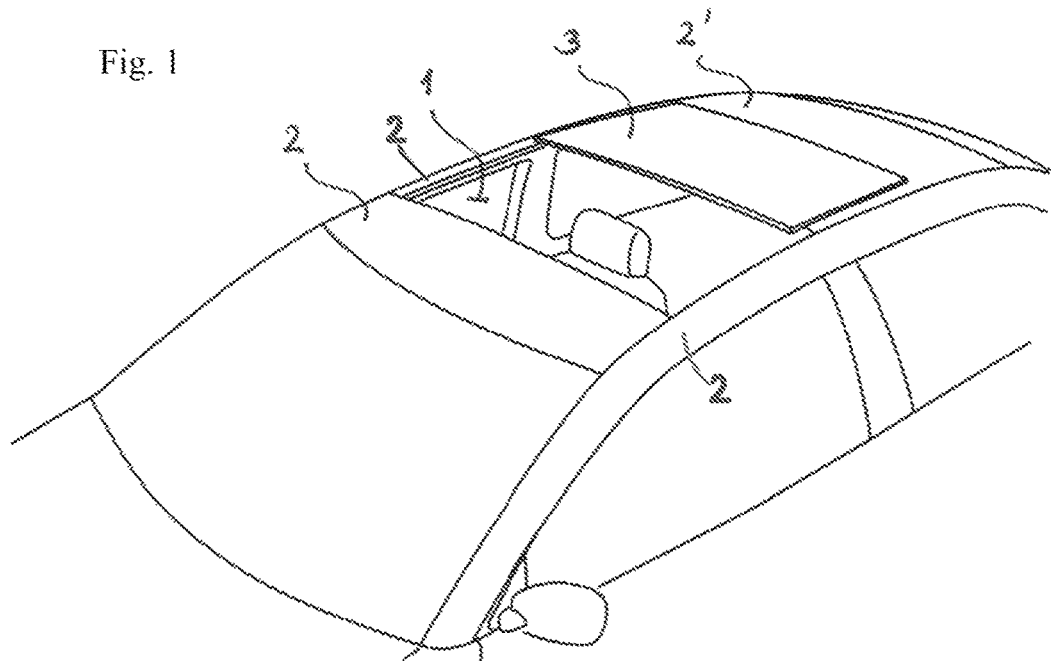
FIG. 1 is a schematic perspective view of a part of a vehicle with an embodiment of the open roof construction in an open position.

FIG. 1 shows part of a vehicle which comprises a roof opening 1 defined in a (stationary) roof part 2. A panel 3 is movable between a closed position (not shown) in which it closes the roof opening 1, and an open position (FIG. 1) in which it opens the roof opening 1 and is positioned at least partially above a roof part 2' adjoining the roof opening 1 on the rear side thereof. This rear roof part 2' may be part of the stationary or formed as a separate panel which is either fixed or movable.

As is known per se such an open roof construction (which is also known as a top slider roof) could comprise additional elements, such as for example a tiltable wind deflector positioned ahead of the roof opening 1, or further movable or stationary panels, for example in a position behind the panel 3 when it is in its closed position, i.e. forming roof part 2'.

Figure 2:
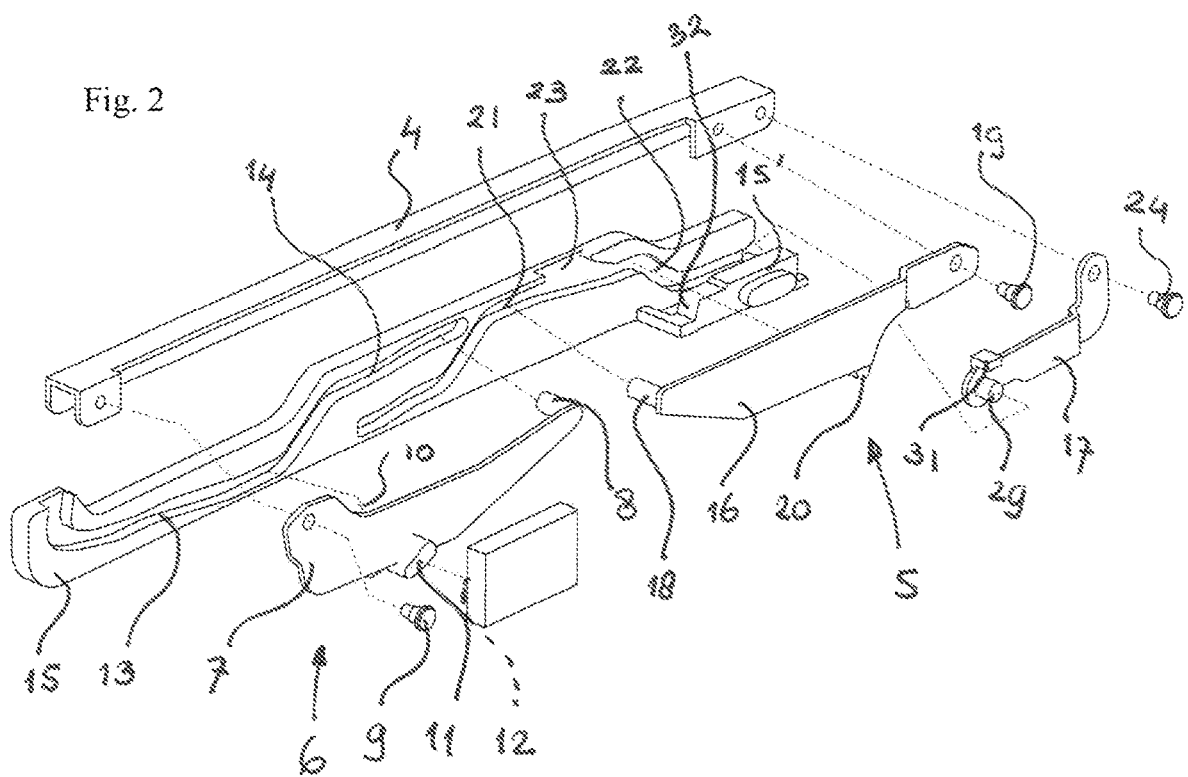
FIG. 2 is an enlarged exploded view of a part of the operating mechanism for the open roof construction of FIG. 1.

The movement of the panel 3 from the closed position towards an open position as illustrated in FIG. 1 is governed by an operating mechanism, parts of which have been illustrated in FIG. 2 and the operation of which is illustrated schematically in FIGS. 3A-3D. It is noted that FIGS. 2 and 3 represent an operating mechanism on one longitudinal (with respect to the vehicle, i.e. X-direction) side of the roof construction, i.e. one longitudinal side of the panel 3, and it should be understood that a corresponding operating mechanism normally will be provided at the opposite longitudinal side, generally in mirror image.

FIG. 2 show parts of one of the operating mechanisms. The mechanism is connected to the panel 3 (FIG. 3D) through a panel bracket 4 which is fixed to the lower side of the panel near the longitudinal edge thereof in any known manner, for example through encapsulation or through attachment to another encapsulated part (see FIG. 3D). The operating mechanism includes a first or rear device 5 and a front or second device 6.

The front or second device 6 includes a lever 7. This lever 7 comprises a lower pivot axis, here a pivot pin 8, an upper pivotal connection 9, pivotally connecting lever 7 to panel bracket 4 of panel 3, and an intermediate guide connection 10, here in the form of a cam. In the vicinity of intermediate guide connection 10, but on the other side of lever 7, i.e. on the side opposite to parts 8, 9 and 10, there is arranged a guide member 11 in the form of a guide cam. This guide member 11 is adapted to be in sliding engagement with a stationary guide curve 12. The stationary guide curve includes a rear portion 12' (FIG. 3D) extending substantially parallel to panel 3 when in closed position, and a front portion 12" extending substantially perpendicularly, or at least at an angle, to the rear portion 12'. As guide member 11 has a substantially oval shape, the height of the guide curve 12 varies along its length depending on orientation of the guide curve 12, but also on the projected orientation of lever 7 and the variation of this orientation of lever 7 along the length of guide curve 12. The second or front device 6 supports the front side of panel 3 and moves it in vertical direction.

The pivot pin 8 and intermediate guide connection 10 engage in their own guide curves 13, 14 in a control slide 15, but in this embodiment these curves 13, 14 are united into a single curve. The shape of curve 13, 14 is chosen such as to obtain the desired movement of the front side of panel 3. The control slide is provided to control vertical (Z) and horizontal (X) movements of panel 3.

The rear or first device 5 includes a lifting member, here in the form of a lifting lever 16 and a support lever 17. The lifting lever 16 comprises a lower pivot axis, here a pivot pin 18, an upper pivotal connection 19, pivotally and continuously fixing lifting lever 16 to panel bracket 4 of panel 3, and an intermediate guide connection 20, here in the form of a guide pin. Pins 18 and 20 engage their own guide curve 21, 22 in control slide 15, the shape of which is chosen such that the desired movements of the rear side of panel 3 is obtained. When pins 18 and 20 are in their guide curve 21, 22, they support the rear side of panel 3 through lifting lever 16 and control slide 15.

Further details and operation of the first and second device of the operating mechanism are disclosed in U.S. Pat. No. 7,828,376, the contents of which are incorporated herein by reference thereto.

Figure 3A:
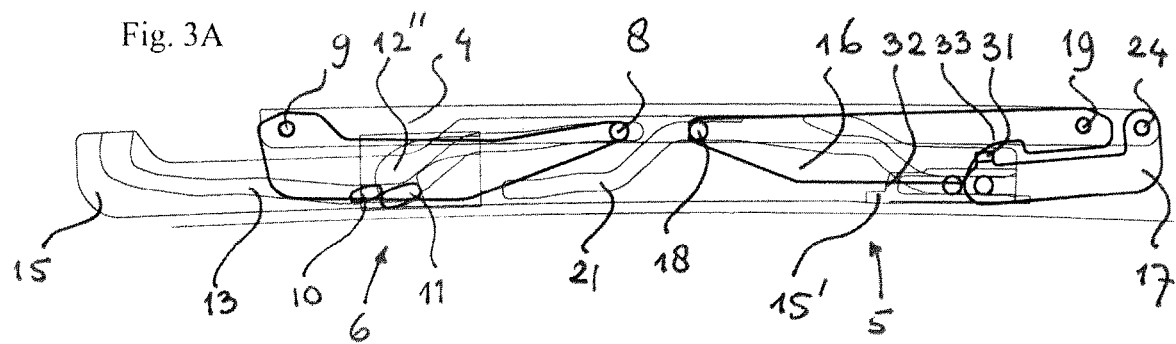
FIGS. 3A-3C are side views of the operating mechanism of FIG. 2 in three different positions.
Figure 3B:
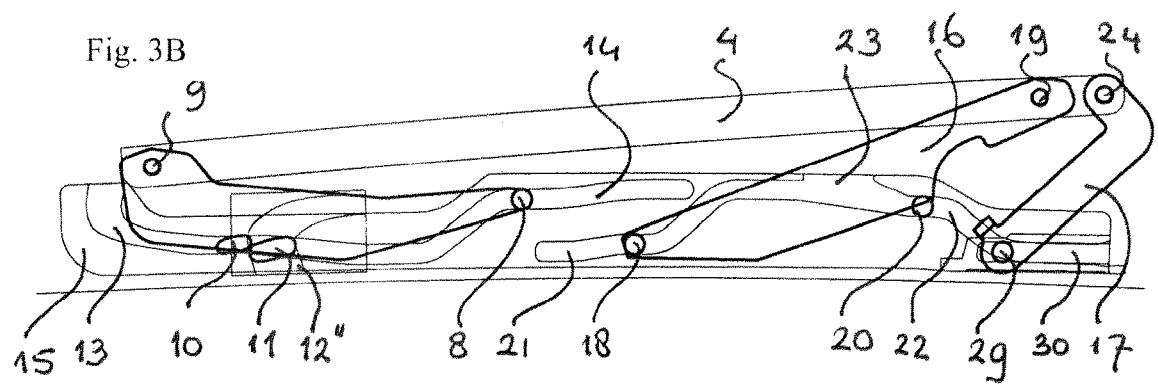
Figure 3C:
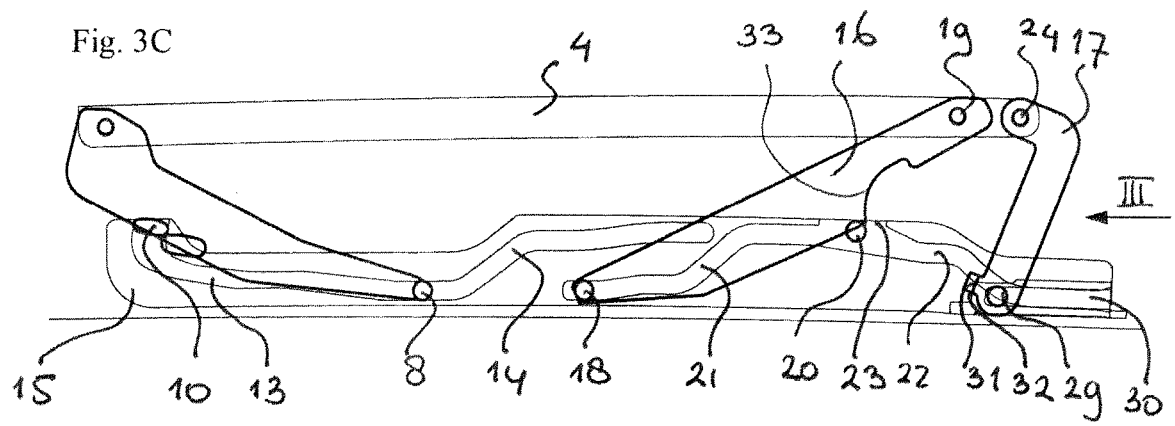

In FIG. 3A-3C it is shown that guide curve 22 of intermediate guide connection 20 of lifting lever 16 widens and is open on its upper side through an opening 23, so that intermediate guide connection 20 and thereby lifting lever 16 is free to move in upper direction when control slide 15 approaches its end position with respect to first and second devices 5, 6, and levers 7 and 16 thereof.

FIGS. 3A-3D further show that support lever 17 is arranged behind lifting lever 16. In this case there is an upper pivotal connection 24 with which support lever 17 is connected directly to bracket 4 of panel 3. Support lever 17 has a hooked shape with a short upper hook perpendicularly on the remainder of support lever 17. As a result it is possible that in the closed position of panel 3 (FIG. 3A) it extends around and close to lifting lever 16. In the closed position of panel 3, the levers 16 and 17 extend for the greater part alongside each other in substantially the same direction. The main portion of support lever 17 ex-tends substantially horizontally and the upper hook portion substantially vertically towards the upper pivotal connection 24 behind upper pivotal connection 19 of lifting level 16. This allows for a small package in Z-direction while avoiding an overlap of both levers 16 and 17. This lack of overlap enables the levers to be aligned in longitudinal direction of the open roof construction (X-direction).

Figure 3D:
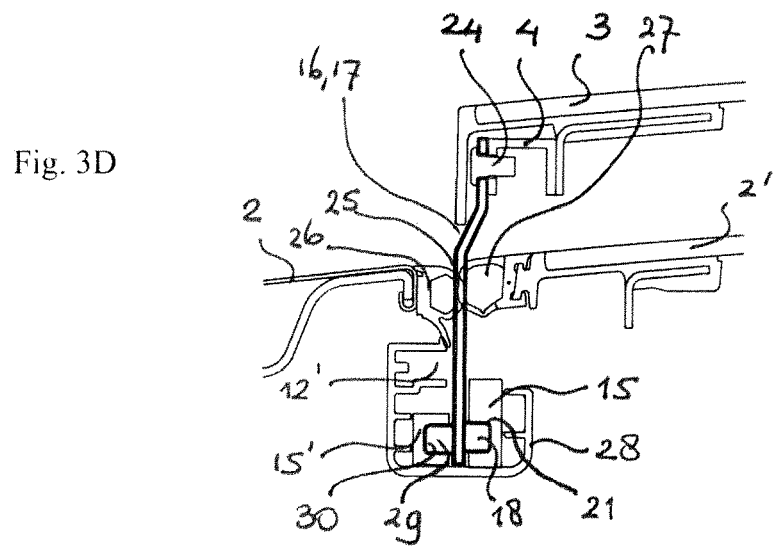
FIG. 3D is a cross-sectional view according to arrow III in FIG. 3C.

The advantage of this longitudinal alignment is illustrated in FIG. 3D, in which a rearward position of panel 3 is shown in which it extends above an adjoining roof part 2'. Between roof part 2' and sidewardly adjacent stationary roof 2 there is a passage opening 25 normally closed by hollow bulb seals 26 and 27. These seals 26, 27 can be deformed by lifting lever 16 and support lever 17 to move through this passage opening 25. Due to the alignment of both levers 16, 17 and the small thickness thereof, the deformation of seals 26 and 27 can be kept small, thereby reducing wear thereof.

The alignment of levers 16, 17 has a further advantage that both levers 16, 17 can be guided in the same groove of a guide rail 28 guiding the operating mechanism. This guide rail 28 extends from the front of roof opening 1 up to a position below roof part 2'. This single guide rail 28 simplifies the structure and minimizes Y-package of the operating mechanism.

FIG. 3D shows that pivot pin 18 of lifting lever 16 extends in opposite direction with respect to a lower pivot pin 29 of support lever 17. FIGS. 2 and 3B show a sub-part 15' of control slide 15 laterally offset from control slide 15 and including a straight slot or curve 30 for lower pivot pin 29 of support lever 17. At a small distance from lower pivot pin 29 is a locking member 31 which may be in the form of a part-cylindrical wall concentric with pivot pin 29. During upward rotation of support lever 17, when positioned at the front end of slot 30, this locking member 31 may lock behind a wall portion 32 of sub-part 15' of control slide 15 so as to lock support lever 17 in its X-position in control slide 15. FIG. 3A shows that lifting lever 16 has a recess 33 in its rear side facing support lever 17 in order to take up locking member 31 in the closed position of panel 3 so that locking member 31 does not negatively influence the close proximity of both levers 16, 17 in the closed position of panel 3.

The operation of rear device 5 of FIGS. 3A-3D is as follows.

In FIG. 3A, panel 3 is in its closed position, so both levers 16, 17 are in their lowest (most horizontal) position. Control slide 15 is in its most forward position, so that pins 18, 20 of lifting lever 16 are in their rear position in guide curves 21, 22. Also lower pivot pin 29 of support lever 17 is in its rear position in slot 30.

FIG. 3B shows the position of the operating mechanism in which panel 3 is in its venting position with the rear of panel 3 lifted by means of lifting lever 16. Intermediate guide connection 20 of lifting lever is near its front position in guide curve 22, while also lower pivot pin 29 of support lever 17 has arrived near its front position in slot 30. Lever 7 of front device 6 takes care of the lock of panel 3 in its front position, in particular guide member 11 in vertical front portion 12'' of stationary guide curve 12.

FIG. 3C shows the position of the operating mechanism in which panel 3 may be moved rearwardly above adjoining roof part 2'. Lever 7 of front device 6 now locks panel 3 to control slide 15 in X-direction, while locking member 31 hooks behind wall portion 32 to lock lower pivot pin 29 of support lever 17 with respect to control slide 15 in X-direction. Because panel 3 is locked in X-direction with respect to control slide 15, support lever 17 is rotationally locked as rotation of support lever 17 would require an X-displacement of panel 3 with respect to control slide 15. Intermediate guide connection 20 of lifting lever 16 is moved into an inactive position below, within or even above opening 23 between guide curves 21, 22 as it is not supported anymore by control slide 15. Thus, the support of rear side of panel 3 is now completely effected by support lever 17. Thus, support lever 17 is able to lift the rear side of panel 3 to a higher level without requiring a greater height of control slide 15 to guide intermediate guide connection 20 to a higher level, thereby obtaining a greater lifting height without a larger Z-package (or because of which the same lifting height can be obtained with a smaller Z-package).

Figure 4A:
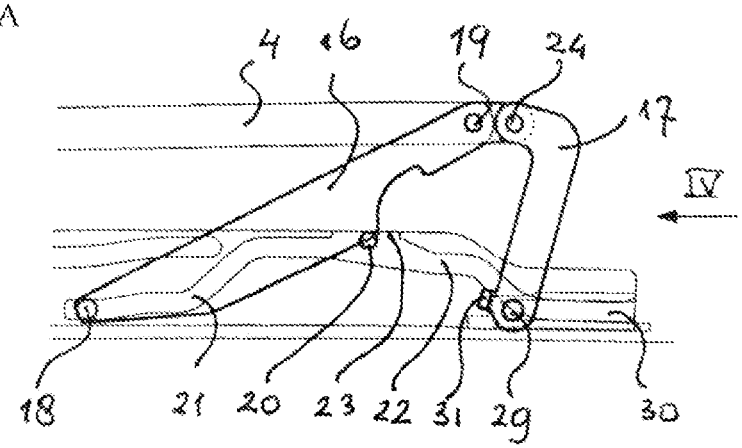
FIGS. 4A and 4B are views corresponding to those of FIGS. 3C and 3D, respectively, but showing a different embodiment.
Figures 4B, 5B:
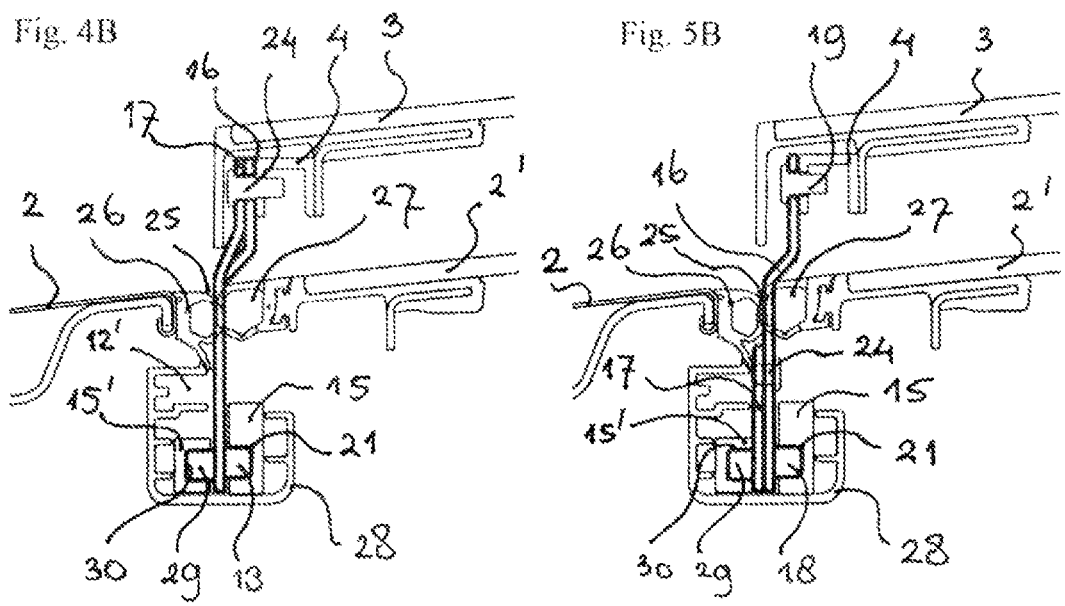
FIGS. 5A and 5B are views corresponding to those of FIGS. 4A and 4B, but showing still another embodiment.

FIGS. 4A and 4B show a second embodiment of the rear device 5, only differing in the connection of levers 16, 17 to bracket 4 of panel 3. Lifting lever 16 is now extended rearwardly beyond upper pivotal connection 19 to allow support lever 17 to connect to lifting lever 16 and not directly to bracket 4 of panel 3. Thus, upper pivot pin 24 of support lever 17 now extends through a hole in the rear portion of lifting lever 16. FIG. 4B shows this. Bracket 4 ends in front of support lever 17 and the pivot pin 24 extends behind the rear end of bracket 4. The upper ends of lifting lever 16 and support lever 17 do now overlap and are therefore not in longitudinal alignment with each other. Therefore one of levers 16, 17 should be offset in lateral direction, such that when both levers are in their upper position, the lower portions of levers 16, 17 are aligned with each other from a Z-position above seals 26, 27 downwardly to their lower ends.

Figure 5A:
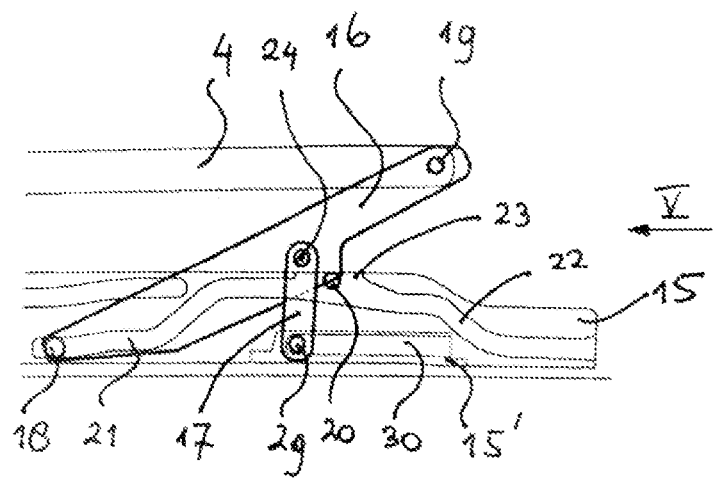

FIGS. 5A, 5B shows a further embodiment of rear device 5, in which support lever 17 is connected to lifting lever 16 in another way. Support lever 17 is now shorter than in the former embodiment and is connected to lifting lever 17 in a central section thereof between upper and lower pivot pins 19, 18 of lifting lever 16. The position of upper pivot pin 24 of support lever 17 is such that in the upper position of support lever 17 in which panel 3 may be moved above roof part 2', upper pivot pin 24 of support lever 17 is still below seals 26, 27 of passage opening 25. This means that only lifting lever 16 extends through passage opening 25 and support lever 17 always remains below seals 26, 27. Thus, the fact that levers 16, 17 are not longitudinally aligned and support lever 17 at least partly overlaps lifting lever 16 does not disturb the passage of rear device 5 through passage opening 25. Lifting lever 16 always supports panel 3, but in lower positions of panel 3 by means of intermediate guide connection 20 and in upper positions of panel 3 by means of support lever 17.

The support lever 17 is always shorter than lifting lever 16 and is active only in its upwardly rotated positions, thereby providing stable support to panel 3, either directly or through lifting lever 16.

The support lever 17 in this embodiment will also have a locking member, either one as in the former embodiments or any other that locks support lever 17 against at least a sliding movement of lower pivot pin 29 thereof.

From the foregoing it will be clear that the invention provides a simple yet very stable operating mechanism for an open roof construction. Due to the support lever the panel can be tilted to a relatively high position without requiring the control slide being high, as the intermediate guide connection of the lifting lever becomes inactive in higher positions of the lifting lever. The upwardly rotated support lever then takes over support from the intermediate guide connection.

The invention is not limited to the embodiment shown in the drawings and described above, which may be varied in different manners within the scope of the invention. For example, the lower pivot of the lifting lever may also be guided directly in the guide groove of the guide rail. Features of different embodiments may be combined to obtain further embodiments.

What is claimed is:

1. An open roof construction for a vehicle having a roof opening defined in a roof part of the vehicle, the vehicle having an adjoining roof part, the open roof construction comprising:
    at least a panel which is movable between a closed position in which the panel closes the roof opening and an open position in which the panel opens the roof opening and is positioned at least partially above the adjoining roof part;
    a first device for moving a rear end of the panel towards a raised position relative to the closed position and above the adjoining roof part;
    a second device for supporting a front side of the panel, wherein the first device includes a lifting lever pivotally connected to the panel and cooperating with a control slide for moving the panel at least to a venting position in which the rear end of the panel is raised, the lifting lever including an intermediate guide connection cooperating with a guide curve in the control slide to control a height of the panel and to support the panel, the control slide and the lifting lever being guided by a guide rail extending in a longitudinal direction of the vehicle at least alongside the roof opening; and
    a support lever also cooperating with the control slide and supporting the panel at least in positions in which the panel is above the adjoining roof part, the support lever taking over support of the panel from the intermediate guide connection of the lifting lever at least in positions of the panel above the adjoining roof part, in which the intermediate guide connection is disengaged from the guide curve in the control slide.

2. The open roof construction according to claim 1, and further comprising one or more seals closing off a passage opening alongside the adjoining roof part above the guide rail and allowing passage of the lifting lever in positions of the panel above the adjoining roof part.

3. The open roof construction according to claim 2, wherein the support lever is connected to the lifting lever at a position in a central section between ends of the lifting lever, and always remains below the one or more seals.

4. The open roof construction of claim 2 wherein the support lever is guided in the guide rail and is adapted to also pass through the passage opening and along the one or more seals.

5. The open roof construction according to claim 4, wherein the lifting lever and the support lever are aligned in longitudinal direction and are preferably positioned such that they do not overlap in any position.

6. The open roof construction according to claim 4, wherein the lifting lever and the support lever do overlap only in parts which, in the positions of the panel above the adjoining roof part, are fully below or above the one or more seals of the passage opening.

7. The open roof construction according to claim 4, wherein the support lever is pivotally fixed to the lifting lever.

8. The open roof construction according to claim 4, wherein the support lever is pivotally fixed to the lifting lever and at least a portion of one of the lifting lever or support lever is laterally offset to allow an overlap in one or more positions.

9. The open roof construction according to claim 4, wherein the support lever is connected to the lifting lever at a position in an end section of the lifting lever beyond the position where the lifting lever is connected to the panel.

10. The open roof construction according to claim 1, wherein the lifting lever cooperates with the control slide also through a second pin-curve connection acting as a lower pivot of the lifting lever.

11. The open roof construction according to claim 4, wherein the lifting lever and the support lever extend from the panel in a forward direction when the panel is in the closed position.

12. The open roof construction according to claim 1, wherein the support lever has a lower pivot pin, which is slidable with respect to the control slide when the lifting lever is active, and which is locked with respect to the control slide when the support lever takes over support of the panel.

13. The open roof construction according to claim 12, wherein the support lever comprises a locking member near the lower pivot pin, the locking member being moved into its locking position with respect to the control slide when the support lever is rotated to its most upward position in which the support lever supports the panel.

14. The open roof construction according to claim 12, wherein the lower pivot pin of the support lever is slidable in a slot which is made in a sub-part of the control slide laterally offset from it.

* * * * *